United States Patent [19]

Hohn

[11] E Re. 30,016

[45] Reissued May 29, 1979

[54] METHOD AND APPARATUS FOR COMPENSATING FOR UNPROGRAMMED CHANGES IN RELATIVE POSITION BETWEEN A MACHINE AND WORKPIECE

[75] Inventor: Richard E. Hohn, Cincinnati, Ohio

[73] Assignee: Cincinnati Milacron Inc., Cincinnati, Ohio

[21] Appl. No.: 843,637

[22] Filed: Oct. 19, 1977

Related U.S. Patent Documents

Reissue of:

[64] Patent No.: 4,011,437
Issued: Mar. 8, 1977
Appl. No.: 612,764
Filed: Sep. 12, 1975

[51] Int. Cl.[2] ..... G06F 15/46; B25J 9/00

[52] U.S. Cl. ..... 364/474; 364/118; 364/513; 414/5

[58] Field of Search ..... 364/474, 102, 107, 115, 364/120, 513, 118; 214/1 CM, 1 B; 198/341, 339; 318/568

[56] References Cited

U.S. PATENT DOCUMENTS

| | | | |
|---|---|---|---|
| Re. 23,437 | 6/1975 | Devol et al. | 198/34 |
| 2,286,571 | 6/1942 | Pollard | 214/1 |
| 2,344,108 | 3/1944 | Roselund | 214/1 |
| 3,259,254 | 7/1966 | Mitchell | 214/1 |
| 3,283,918 | 11/1966 | Devol | 214/1 |
| 3,665,148 | 5/1972 | Yasenchak et al. | 219/125 |
| 3,686,556 | 8/1972 | Anger et al. | 318/595 |
| 3,744,032 | 7/1973 | Engelberger | 364/900 |
| 3,770,140 | 11/1973 | Dukette | 214/1 CM X |
| 3,775,654 | 11/1973 | Anger et al. | 318/599 |
| 3,804,270 | 6/1974 | Harper et al. | 318/39 |
| 3,804,270 | 4/1974 | Michaud | 214/1 CM X |
| 3,881,605 | 5/1975 | Grossman | 214/1 CM |
| 3,888,361 | 6/1975 | Becker et al. | 214/1 CM |
| 3,951,271 | 4/1976 | Mette | 214/1 CM |
| 3,958,682 | 5/1976 | Martin | 198/19 |

FOREIGN PATENT DOCUMENTS

| | | | |
|---|---|---|---|
| 781465 | 8/1957 | United Kingdom | 214/1 |

*Primary Examiner*—Joseph F. Ruggiero
*Attorney, Agent, or Firm*—C. Richard Eby

[57] ABSTRACT

A method and apparatus are disclosed for modifying command signals representing predetermined positions of a machine element relative a workpiece as a function of measurable unprogrammed changes in the relative position therebetween. The machine element is responsive to a servomechanism circuit which in turn responds to a control device producing the command signals to command motion of the machine element to programmed points relative to the workpiece. The servomechanism circuit produces interrupt signals for transferring the command signals thereto. A measuring circuit is responsive to the unprogrammed change in relative position between the machine element and the workpiece and is operative to produce feedback signals representing the direction and magnitude of the change in relative position. A first circuit is responsive to the measuring circuit for producing a first signal representing a current unprogrammed change in relative position with reference to a predetermined point. A second circuit is responsive to the measuring circuit for producing a second signal representing an estimate of the unprogrammed change in relative position during a queuing delay defined by a number of interrupt signals. A further circuit is operative to modify the command signals as a function of the first signals and the second signals whereby said modified command signals are compensated by the unprogrammed change in relative position and cause the machine element to move to the predetermined positions relative to the workpiece.

41 Claims, 12 Drawing Figures

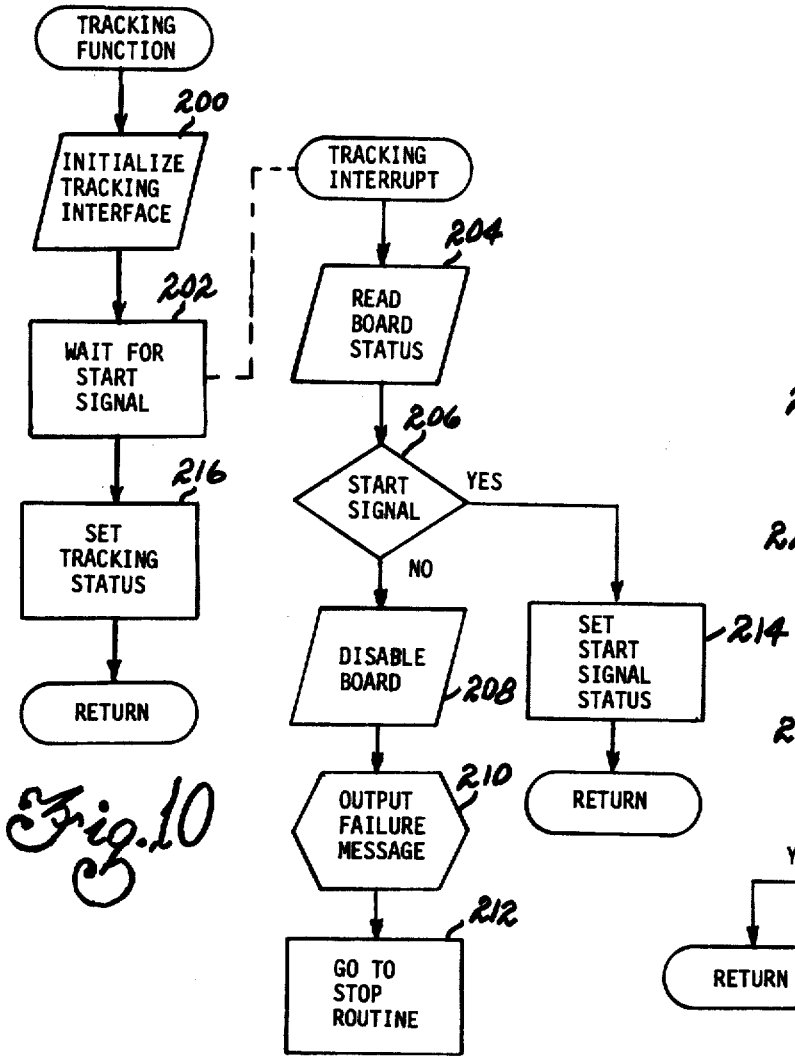
Fig. 10
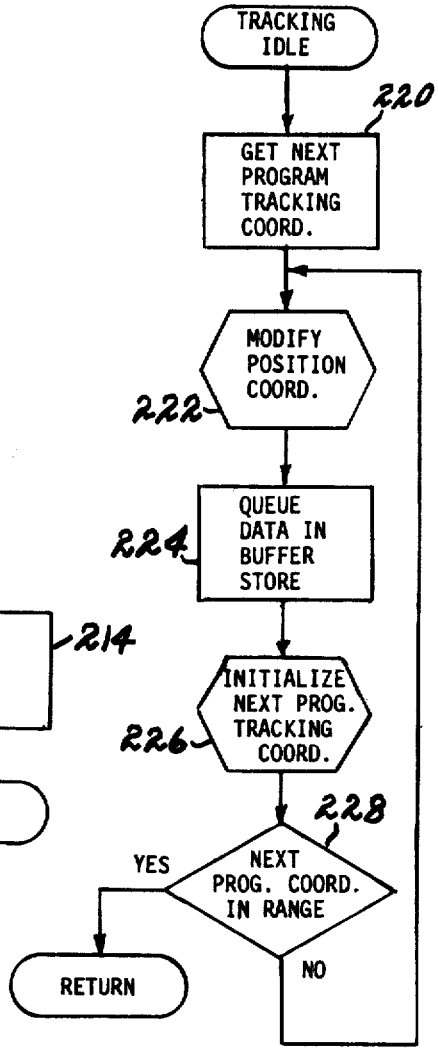
Fig. 11
Fig. 12
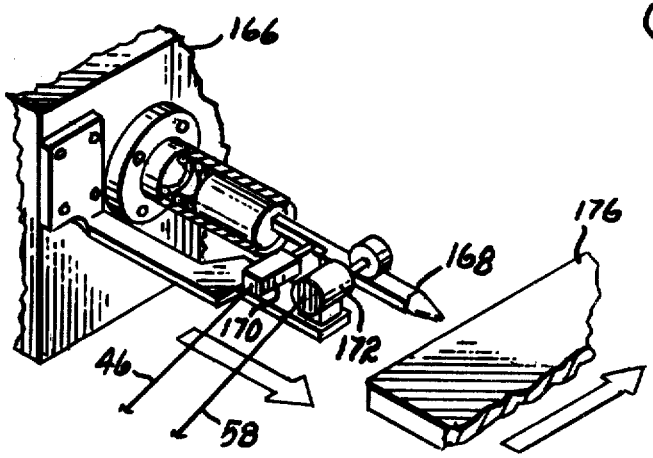

METHOD AND APPARATUS FOR COMPENSATING FOR UNPROGRAMMED CHANGES IN RELATIVE POSITION BETWEEN A MACHINE AND WORKPIECE

Matter enclosed in heavy brackets [ ] appears in the original patent but forms no part of this reissue specification; matter printed in italics indicates the additions made by reissue.

BACKGROUND OF THE INVENTION

The invention relates generally to the area of programmable machines and specifically discloses a method and apparatus for synchronizing the operation of a machine element with a workpiece which is experiencing a measurable unprogrammed change of position with respect to the machine.

There is significant current development in the area of programmable industrial manipulators. These devices have great versatility and may be employed in relatively simple operations, e.g. loading and unloading workpieces, painting, welding, assembling, etc. Industrial manipulators are generally designed to operate in conjunction with a stationary workpiece. However, to maintain the economies of many industrial environments, it is necessary that a manipulator operate in conjunction with a workpiece as it is found in the existing industrial environment. This substantially increases the complexity of the problem. Generally, when manipulators are programmed, the relative position of the manipulator to the workpiece is fixed. However, in many industrial enviroments, the position of the workpiece relative to the manipulator may change during the execution of a program.

One example of the above situation is the requirment that a machine execute a program of operations while the workpiece is moving past the machine on a conveyor. The prior art illustrates several solutions to this problem. One solution shown is to mount the machine on a moving base, and the motion of the moving base is synchronized with the conveyor motion by electrical, hydraulic or mechanical means. In a second solution, the machine remains stationary; but the conveyor motion is programmed during a dry cycle. Therefore, during the execution of the program, the machine operation is coordinated with the conveyor motion. Finally, one solution illustrates programming the machine by a lead through method while the conveyor is moving, therefore, the conveyor motion is inherently part of the program.

A stationary base machine is disclosed which responds to unprogrammed changes in relative position between the machine and workpiece. However, the disclosed invention is applicable to any machine regardless of its configuration. Further, the disclosed invention can compensate for any measurable unprogrammed change in relative position between the machine and workpiece. Further, the invention is not dependent on the location of a measuring device detecting the unprogrammed change in relative position.

SUMMARY OF THE INVENTION

According to one embodiment of the invention, a method and apparatus are disclosed for modifying command signals representing predetermined positions of a machine element relative to a workpiece. The machine element is controlled by a servomechanism circuit generating interrupt signals defining fixed time intervals. The apparatus operates in response to the command signals to produce modified command signals and transfers the modified command signals to a servomechanism circuit in response to the interrupt signals. The apparatus comprises means for producing feedback signals representing the sign and magnitude of unprogrammed changes in the relative position between the machine element and the workpiece. Further means are responsive to the feedback signals for producing a first signal representing the unprogrammed change in relative position with respect to a predetermined point. Means are provided for producing a second signal representing the average change in relative position during a queuing time defined by a number of the fixed time intervals. Further, means are provided for modifying the command signals as a function of the first and second signals to produce the modified command signals. These signals compensate for the unprogrammed changes in relative position between the machine element and the workpiece and are operative to move the machine element to the predetermined positions relative to the workpiece.

BRIEF DESCRIPTION OF THE DRAWINGS

FIG. 10 is a flow chart of a routine for intiating the operation of the conveyor tracking system.

FIG. 11 is a flow chart of a routine for continuously modifying the command signals as a function of unprogrammed changes in the relative position between the machine element and workpiece.

FIG. 12 illustrates a further embodiment of the disclosed invention.

DESCRIPTION OF THE PREFERRED EMBODIMENT

Figure 1:
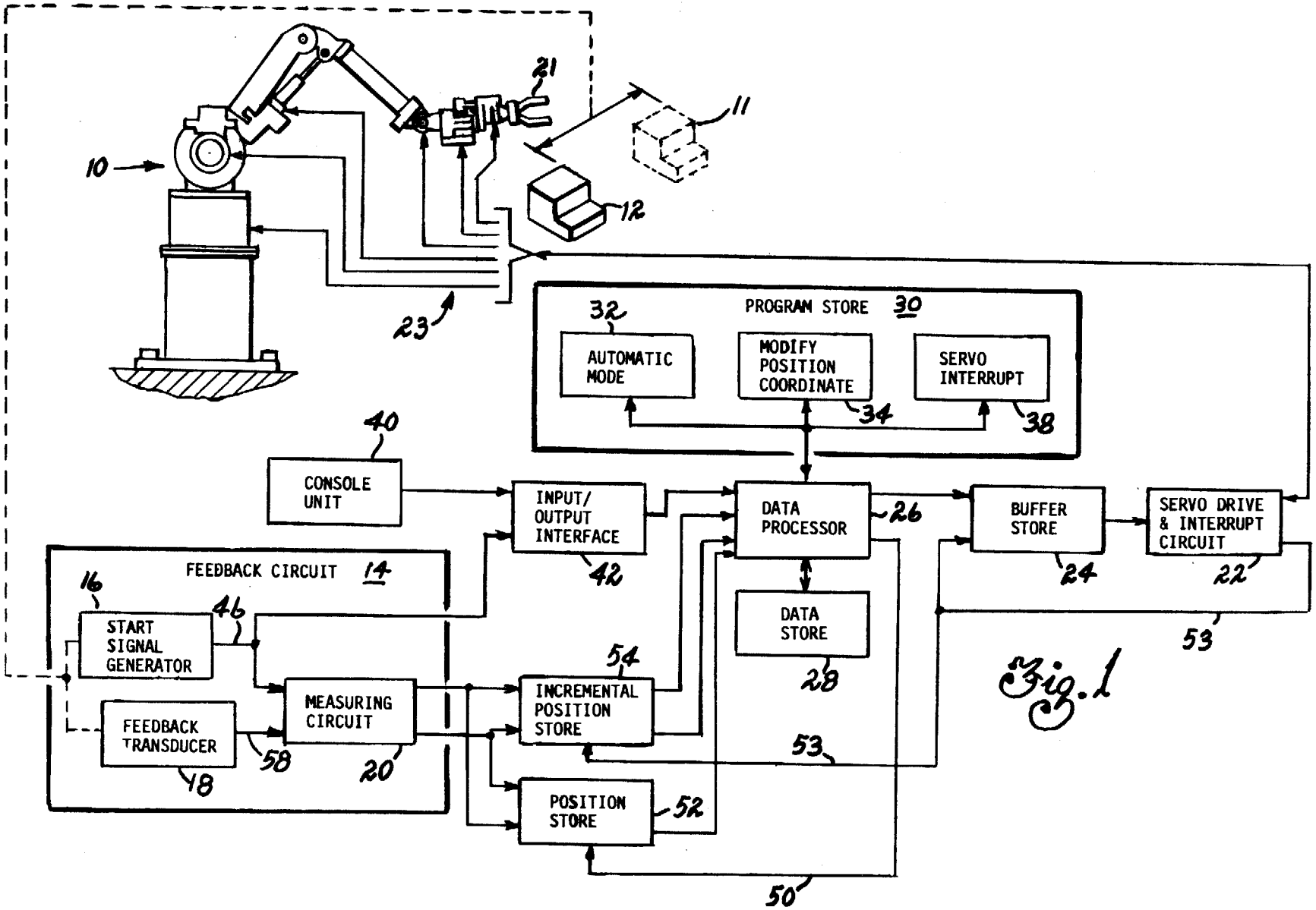
FIG. 1 is a block diagram of a control system illustrating the elements of the disclosed invention.

FIG. 1 is a diagram of a control system illustrating the elements of the disclosed invention. In FIG. 1, a workpiece 12 is shown in full view and in phantom. The phantom view 11 illustrates a measurable unprogrammed change in position of the workpiece 12 relative to a machine 10. The invention is applicable to any measurable relative change in position.

The machine 10 is illustrated as an articulated arm which has an actuator and feedback transducer at each joint. The configuration of the machine as well as the drive mechanism for moving the machine element 21 is not a limitation of the present invention. The disclosed invention can be applied to a machine of any configuration or drive.

A feedback circuit 14 is responsive to the unprogrammed change in the relative position between the machine element 21 and workpiece 12 and produces feedback signals representing the direction and magnitude of the unprogrammed change in the relative position. The feedback circuit 14 is comprised of a start signal generator 16, a feedback transducer 18 and a measuring circuit 20. The exact embodiment of the start signal generator 16 and feedback transducer 18 is dependent on the application and the relative change in position being measured. For example, if the workpiece is on a moving conveyor which provides an unprogrammed change in the relative position between the machine and the workpiece, the start signal generator may be a limit switch; and the feedback transducer may be an encoder or resolver connected to the conveyor. In the alternative, the feedback transducer may be mounted on the machine element in association with a probe device. Upon contact between the probe and the workpiece, a start signal is generated; and the probe may then be used to detect a change in the relative position therebetween.

The measuring circuit 20 is responsive to a start signal on line 46 produced by the start signal generator 16 which is operative to reset the measuring circuit. The measuring circuit 20 is also responsive to output signals on line 58 from the feedback transducer representing the unprogrammed changes in relative position. Therefore, from the time of occurence of the start signal, the measuring circuit detects the sign and incremental magnitude of the unprogrammed changes in relative position between the machine element 21 and workpiece 12. As will be appreciated by those who are skilled in the art, in the above disclosure, the output of feedback signals are incremental in nature. The start signal generator produces a reference signal from which the measuring circuit may begin detecting the output signal from the feedback transducer. Therefore, the start signal generator provides the output signal from the feedback transducer with an absolute characteristic. The same function may be achieved by using a feedback transducer having an output signal which is absolute in nature. In other words, the output signal represents the absolute position of the conveyor relative to some predetermined reference point. Therefore, with the absolute feedback transducer, a start signal generator would not be required.

A position store 52 is responsive to the feedback signals from the measuring circuit and a reset signal on the line 50 from the data processor 26. The processor 26 is responsive to the start signal on line 46 via the input-/output interface 42 for producing a reset signal to the position store 52. The reset signal causes the position store 52 to be reset *to* some predetermined number. Therefore, the position store produces an absolute position signal representing the total unprogrammed change in the relative position with respect to said predetermined [member] *number.*

An incremental position store 54 is also responsive to the feedback signals and is further responsive to an interrupt signal on line 53 from the servo drive and interrupt circuit 22. With the occurrence of each interrupt signal, the incremental position store 54 is reset to zero. Therefore, the incremental position store 54 produces an incremental position signal representing the unprogrammed change in the relative position between interrupt signals.

The lines at 23 illustrate the transfer of modified command signals from the servo drive and interrupt circuit 22 to the machine actuators and the return of signals from the feedback transducers to the servo drive and interrupt circuit 22. The servo drive and interrupt circuit 22 operates with a buffer store 24 which queues command signals generated by the data processor 26. Associated with the processor 26 is a data store 28 and a program store 30. The program store contains an automatic mode program 32 for operating the machine element in response to input signals representing predetermined points in space. Next, a modify command signal program 34 is operative with the processor 26, the position store 52 and the incremental position store 54 for modifying command signals generated during the automatic mode. Finally, a servo-interrupt program 38 operates in conjunction with the servo drive and interrupt circuit 22 for transferring the command signals from the buffer store to the servo drive circuit 22. A console unit 40 is operative with an input/output interface 42 for causing the machine element to respond to a number of manually initiated input signals.

One further characteristic of the disclosed system should be discussed at this point. The signals generated by the processor 26 are not transferred directly to the servo drive and interrupt circuit 22 but are transferred to a buffer store 24. The servo drive and interrupt circuit 22 operates on a fixed time base which is nonsynchronous with the operation of the processor 26. At successive fixed time intervals, the servo drive circuit 22 produces an interrupt signal which is operative to transfer a command signal from the buffer store 24 to the servo drive circuit 22. The signal represents the distance the machine element 21 is to move between interrupt signals. To guarantee that there is no discontinuity of operation, the processor generates data in advance and queues one or more command signals in the buffer store. The number of signals queued is a function of many things including the particular application, the hardware available and the discretion of an individual design engineer.

However, when a number of operations are programmed relative to a stationary workpiece and are executed relative to a workpiece which has changed position relative to the machine, the asynchronous operation of the processor and the servo drive and interrupt circuit gives rise to an error. The queuing delay of the command signals and the change in position of the workpiece during this delay will cause a loss of alignment between the actual position of the workpiece and the position defined by the command signals. The disclosed method and apparatus is effective to compensate for this loss of alignment and may be readily adapted to accommodate any number of queuing delays.

Figure 2:
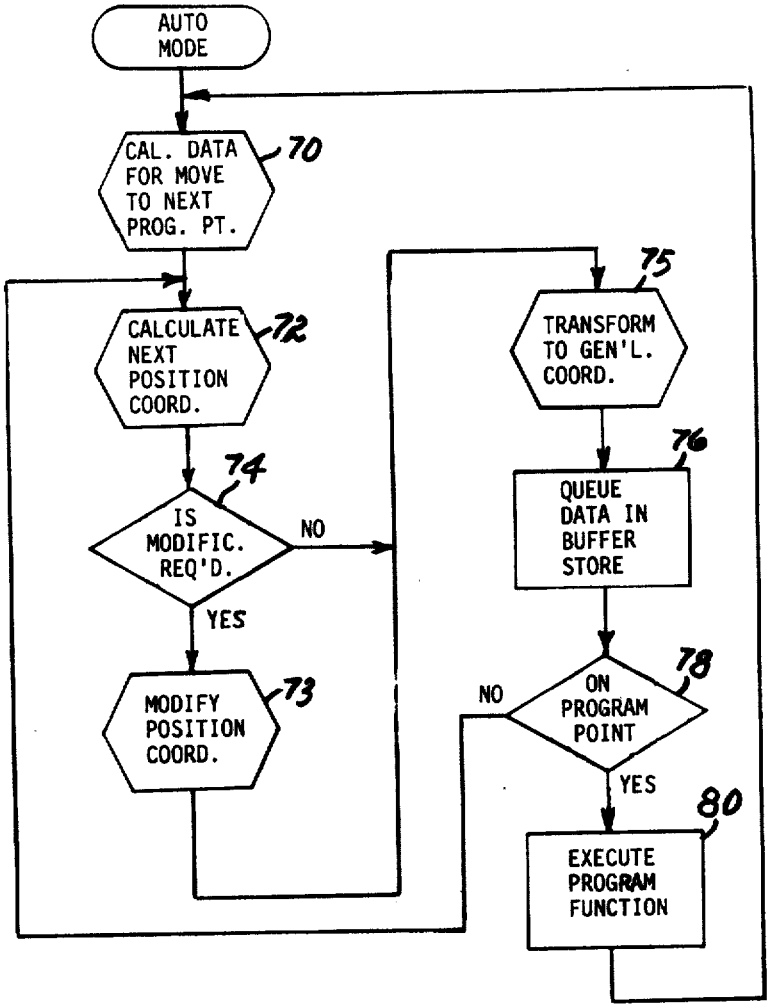
FIG. 2 is a flow chart of a general routine for operating the system in an automatic mode.

FIG. 2 is a flow chart of a routine illustrating a general cycle of operation when operating in an automatic mode. It should be noted that FIG. 2 is general in nature and specific only in the areas where the automatic mode operation interfaces with the modification function. The prior art illustrates a number of systems for operating a machine in an automatic mode in response to stored program information. Further, the automatic mode of operation of the preferred embodiment is disclosed in detail in copending application Ser No.

364,381 filed May 31, 1973, now U.S. Pat. No. 3,909,600 and assigned to the present assignee.

In FIG. 2, block 70 calls for the calculation of parameters which are required to move the machine element 21 from its present position to the next programmed point. Next, the block 72 requires that command signals be generated by the processor representing the coordinate values of the next point to which the machine element is to move. The system contains an interpolation capability which will iteratively produce a number of command signals representing a number of points along a predetermined path between two of the programmed points. After the command signals representing the coordinate values of the next point are produced, the process block 74 determines whether or not a modification of the data is required. If modification is not required, the process moves to block 75 which transforms the coordinate values represented by the command signals to coordinate values which represent the next point with respect to a coordinate system defined by the physical configuration of the machine 10. Obviously, if the geometry of the machine defines the same coordinate system in which the data is stored, then a transformation step is not required. However, in the preferred embodiment, the data is stored with respect to a convenient coordinate system which is not defined by the geometric configuration of the machine. After the transformation, the process moves to block 76 where the transformed command signals are queued in the buffer store to await a servo interrupt. As discussed earlier the servo drive and interrupt circuit operates asynchronously with the timing within the processor 26.

Figure 3:
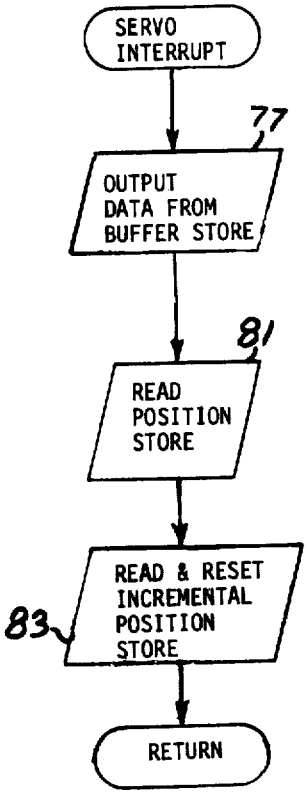
FIG. 3 is a flow chart of a routine for generating signals for the servo-drive and interrupt circuit.

FIG. 3 illustrates a simple routine describing the operation of the servo interrupt. When the servo drive and interrupt circuit 22 produces a servo interrupt signal, block 77, requires that the command signals representing the coordinate values of the next point be transferred from the buffer store 24 to the servo drive and interrupt circuit 22. Further, in response to the servo interrupt signal input/output block 81 requires that an absolute position signal be read from the position store 52. Further, input/output block 83 reads an incremental position signal from the incremental position store 54, and the store is reset to zero. The absolute and incremental position signals are temporarily stored until required by the process.

It should be noted that a new position of the machine element may be defined by a number of command signals representing coordinate values corresponding to the number of degrees of freedom of the machine element; and these command signals will be output to the servo drive circuit at this time. As shown in FIG. 2, the initial generation of command signals and the transfer of command signals to the servomechanism circuit is completely unaffected by the disclosed position modification process. After the regular automatic process in process block 72 has defined the command signals representing new coordinate values of a successive point, the apparatus disclosed herein is operable to modify the command signals to compensate for an unprogrammed change in relative position between the machine element and workpiece. The modified command signals are transferred to the servomechanism by means of the process defined in block 76 of FIG. 2 and block 77 of FIG. 3.

At the end of the servo-interrupt, the process continues to the decision block 78 which determines whether or not the process is on a programmed point. If the process is not on a programmed point, it returns to block 72 to calculate the next set of command signals representing coordinate values of a further point along the predetermined path. The process cycles in this manner until the next program point is reached. At this time, the process moves to sub-routine block 80 which requires that the programmed function for that point be executed.

If process block 74 requires a modification of the command signals, the process moves to process block 73 which calls for a subroutine to execute the modification process. The modification subroutine is shown in detail in FIG. 4. The first block 130 of FIG. 4 calls for a subroutine to determine the current unprogrammed change in relative position between the machine and workpiece. This process is generally illustrated in FIG. 5 wherein the first block 102 requires that the absolute position signal representing the current unprogrammed change in the relative position read during the last interrupt signal be recalled from temporary storage. A first signal is produced by scaling the absolute position signal in block 104 as a function of the mechanical gearing used with the feedback transducer to cause the resolution of the first signal to correspond to the resolution of the command signals. After the current unprogrammed change in the relative position has been determined, the process in FIG. 4 calls for a subroutine in block 132 to calculate the unprogrammed change in the relative position from the time the absolute position signal is read from the store 52 until the time a servo interrupt signal occurs transferring to the servomechanism a modified command signal embodying the first signal. The above time period is referred to herein as the queuing time.

Figure 6:
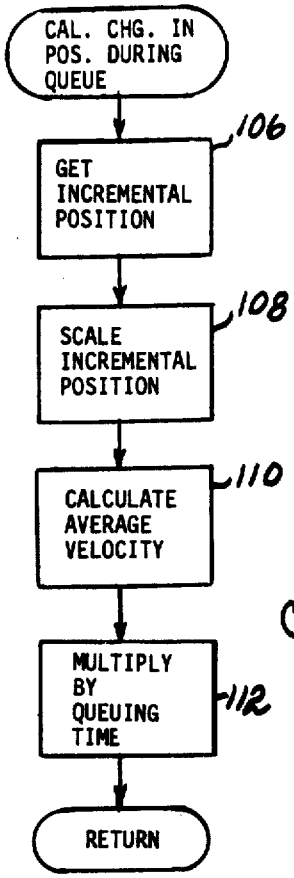
FIG. 6 is a flow chart of a routine for calculating the unprogrammed change in the relative position during the queuing time.

FIG. 6 illustrates generally the steps required to estimate the unprogrammed change in the relative position during the queuing time. First in block 106, the incremental position signal which was read during the last interrupt signal is recalled from temporary storage. Next, in block 108, the incremental position signal is scaled to cause its resolution to correspond to the resolution of the command signals. The incremental position signal represents the unprogrammed change in the relative position between the machine element and workpiece during the fixed time interval between interrupt signals. Consequently the incremental position signal dimensionally represents velocity. Therefore, the unprogrammed change in the relative position during the queuing time may be calculated by multiplying the velocity during the intervals defining the queuing time by the duration of the queuing time.

It should be remembered that the purpose of the subroutine in FIG. 6 is to estimate an unprogrammed change in relative position during a future queuing time which is defined by a number of fixed time intervals. To estimate this change in the relative position, one may decide to measure the change in the relative position during a prior queuing time and use that as an estimate of the change in the relative position during a subsequent queuing time. However, as a practical [manner,] *matter* the change in the relative position may not occur in a smooth continuous manner, but may occur in an intermittent manner. Therefore, monitoring a single fixed time interval to estimate a change in the relative position may give rise to a substantially inaccurate estimate. To achieve a more accurate estimate, in the preferred embodiment, the change in the relative position over a few number of fixed time intervals is averaged. This is done by process block 110. As will be appreciated by those who are skilled in the art, there are a number of techniques which may be used to determine the average change in the relative position. The choice of a particular technique is not important to the present [disclosed] *discosure,* and therefore, the averaging process will not be discussed in further detail. After the average change in the relative position over a number of fixed time intervals is determined, it is multiplied by the queuing time to provide a second signal representing an estimate of a change in the relative position between the machine element and the workpiece during a subsequent queuing time.

Figure 4:
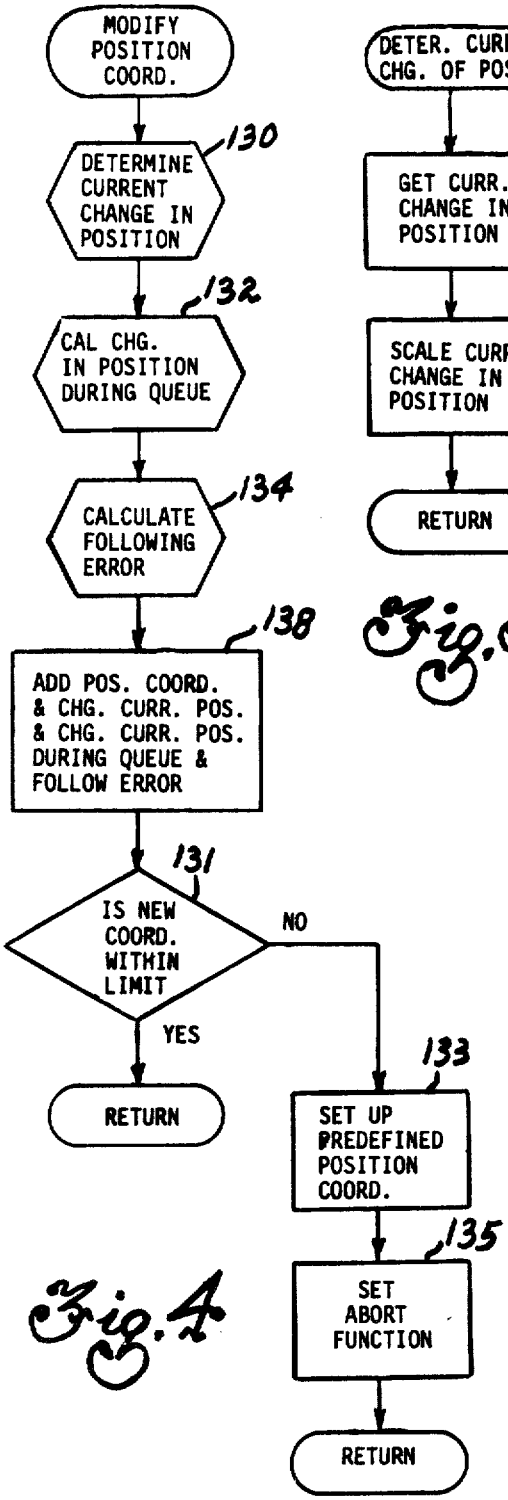
FIG. 4 is a detailed flow chart of a routine for modifying the command signals to compensate for the unprogrammed change in the relative position.
Figure 5:
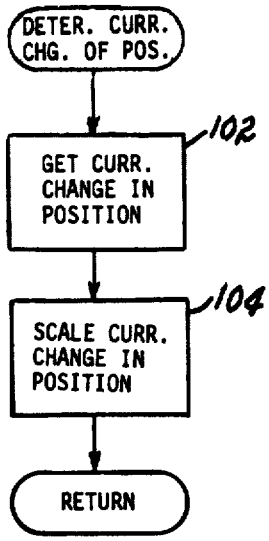
FIG. 5 is a flow chart of a routine for determining the current unprogrammed change in the relative position.
Figure 7:
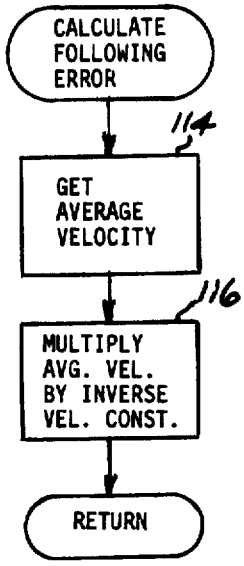
FIG. 7 is a flow chart of a routine for calculating the following error of a machine in response to the modification of the command signals.

The process then returns to the process of FIG. 4 and moves to block 134 which requires the generation of a following error signal. The following error is defined as the inherent lag in the servo loop in response to an input signal derived from the change in the relative position. This lag in response of the machine to the input signal is a function of the gain of the servo loop. In the preferred embodiment, a relatively low gain system is used which will have a larger following error. Consequently, the disclosed process operates to modify the command signals as a function of the ratio of the rate of the unprogrammed change in the relative position to the velocity constant of the servomechanism. This modification represents a feed forward signal to cause the actual position of the machine element to more closely correspond to its desired position. The calculation of following error is shown in FIG. 7. First, in block 114, the average velocity signal as previously determined is recalled from temporary storage. Next, in block 116, the average velocity is multiplied by the inverse of the velocity constant to produce a following error signal representing the following error of the machine element in response to the input generated by the unprogrammed change in relative position between the machine and workpiece. As will be appreciated, in determining the following error signal, it is assumed that the position loop gain is the same for each of the axes of motion. Further, a feedforward signal may be generated in the servo drive and interrupt circuit in which case the following error signal as generated in FIG. 7 would not be required. After the following error is determined, the process returns to FIG. 4.

Process block 138 is operative to generate modified command signals. Generally, the unprogrammed change in the relative position will be measured along an axis parallel to one of coordinate axes associated with one of the command signals. Therefore, this command signal will be modified and the other command signals will continue through the process of FIG. 2 in the normal manner. In some cases, the unprogrammed change in the relative position may be measured along a path which is not parallel to one of the coordinate axes associated with one of the command signals. In this case, the measured unprogrammed change in the relative position must be broken down into components along the coordinate axes associated with the command signals. Therefore, the command signals associated with the coordinate axes requiring modification will be modified in the process block 138, and the other command signals will continue through the process of FIG. 2 in the normal manner. Process block 138 generates a modified command signal by causing the appropriate command signal to be added to the sum of the first signal representing the current unprogrammed change in the relative position plus the second signal representing the unprogrammed change in the relative position during the queuing time plus the following error signal. The modified command signal is operative to move the machine element to the point defined by the command signal even though an unprogrammed change in the relative position between the machine element and the workpiece has occurred.

After the modified command signal has been generated, process block 131 determines whether or not the modified command signal defines a point within the operating range of the machine element. If the modified command signal defines a point outside the operational limits of the machine element, the process moves to block 133 which establishes a set of predefined position signals which will withdraw the machine element from the environment of the workpiece. Next, process block 135 sets up an abort function to cause the machine to abort the current cycle of operation and move to the point defined by the predetermined position signals. If process block 131 determines that the modified command signal defines a point within the physical limits of the machine, the process returns to the process of FIG. 2. If required, the command signals are transformed and queued in the buffer store by process block 76 to await a subsequent servo interrupt.

Figure 8:
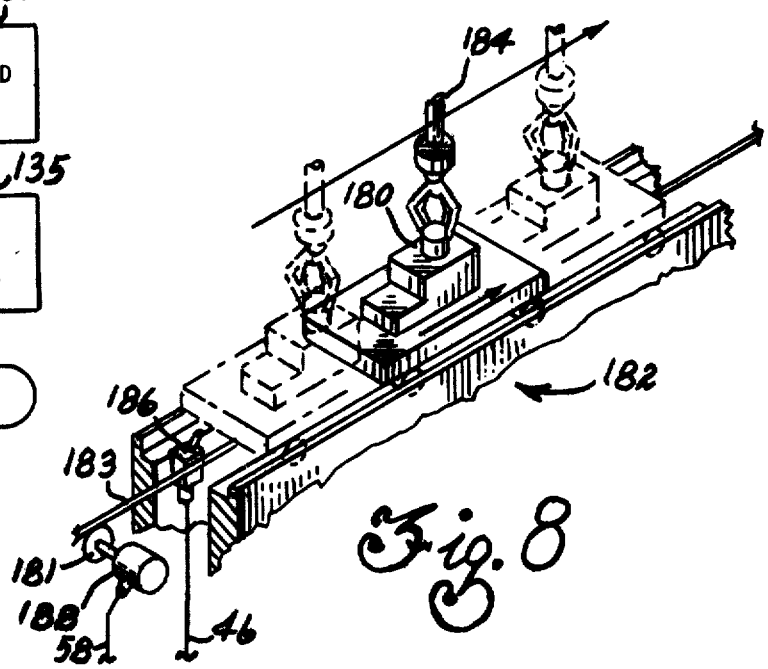
FIG. 8 illustrates a conveyor tracking embodiment of the disclosed invention.

The modification process described above is susceptible to many applications. For example, FIG. 8 illustrates conjunction with a conveyor tracking operation. A workpiece 180 is contained on a moving conveyor 182 which moves the workpiece past the machine element 184. A switching device 186 corresponds to the start signal generator 16 shown in FIG. 1, and a resolver 188 corresponds to the feedback transducer 18 shown in FIG. 1.

In the tracking embodiment, input signals representing the predetermined points which define an overall path of motion of the machine element are programmed by manually moving the machine element to each of the predetermined points. At each of the predetermined points, the processor stores input signals representing coordinate values of the predetermined points in the data store 28 shown in FIG. 1. This type of teaching technique is referred to as on-line programming. Further, to achieve this programming operation, push buttons and other input devices contained on the console unit 40 are used in conjunction with a teaching program (not shown) to command the desired motion of the machine 10. When the element 21 or 184 in FIG. 8 is in a desired position, the operator executes a program function which causes the processor 26 to transfer data defining the coordinate values of the desired position [of] *to* a data store 28. After a complete cycle of operation has been programmed, the system is switched to an automatic mode. The stored data is sequentially recalled by the processor, and command signals are produced to cause the machine element to move through a cycle of motion defined by the programmed points. A teaching system of the type preferred is fully disclosed in a [co-pening] *co-pending* application Ser. No. 488,968 filed on July 16, 1974, now U.S. Pat. No. 3,920,972 and assigned to the present assignee. Because there are a number of on-line programming systems shown in the prior art, a full disclosure of such a teaching system will not be recited at this time. The teaching system will only be discussed as it relates specifically to the modification process.

Referring to FIG. 8, when in the on-line teaching mode, a tracking function signal is programmed; and the conveyor 182 is activated to move the workpiece 180 within the operating range of the machine element 184. In doing so, the workpiece activates a switching device 186. This device may be a limit switch, optical sensor or other apparatus for sensing the presence of the workpiece 180 on the conveyor 182 within the operating range of the machine element 184.

When the workpiece activates the switching device 186, a start signal is generated on line 46 which is operative to reset a measuring circuit 20 shown in FIG. 1. The measuring circuit 20 may be any apparatus for measuring the motion of the conveyor after the switching device 186 has been actuated. The start signal is transferred through the input/output interface 42 to the processor 26. The processor 26 is operative to generate a preset signal on line 50 to a position store 52. The position store 52 may be preset to any predetermined number including zero. The preset number causes the position store to accumulate the conveyor motion relative to an arbitrary predetermined point along the tracking axis, i.e., the axis of motion parallel to the conveyor motion.

The resolver 188 has a mechanical input 181 in communication with a drive mechanism 183 of the conveyor 182 and produces electrical output signals on a line 58 to the measuring circuit 20. The output signals may be analogue or digital in nature. After being reset by the start signal, the measuring circuit 20 is responsive to the resolver 188 for producing feedback signals representing the direction and incremental magnitudes of motion of the workpiece. The direction and magnitude of motion of the workpiece is stored in the position store 52 which has been preset or biased to some predetermined number. The position store contains an up/-down counter which is responsive to the measuring circuit 20 for producing the absolute position signal.

In the teaching process, after the workpiece has been moved to within the operating range of the machine element 184, it is stopped at some arbitrary position. In response to signals from the console unit 40, the processor 26 produces command signals operative to move the machine element to desired positions relative to the workpiece. After the desired position is achieved, the processor 26 biases a command signal representing a machine element position along a machine coordinate axis parallel to the axis of motion of the conveyor with the first signal derived from the position store 52. The bias may occur by adding or subtracting the first signal from the command signal. However, whichever bias function is chosen in the teach mode, the opposite function must be used when modifying the command signals during the automatic mode. In the preferred embodiment, the first [differenced] *signal* is [difference] *differenced* with the command signal during the teaching process. During the automatic mode the command signal is initialized by adding the first signal thereto. In the teach mode, the biasing process produces an input signal representing a programmed position which is stored in the data store 28.

Consequently, with this process, the position of the workpiece relative to the machine element is constantly monitored during the teaching or programming operation. Further, alignment between the program and the workpiece is maintained even if the workpiece is moved during the teaching process. After the teaching process is completed, the system is switched from a teaching mode to an automatic mode; and the taught program is replayed.

It should be noted at this point that the conveyor tracking apparatus may be used in conjunction with an off-line generated program. To generate an off-line program, the interaction of the machine with the application is simulated at a point removed from the actual operating environment. The simulation may be achieved with physical models and/or computer models. Subsequently, the program may be loaded in a control system in the desired industrial environment.

During the automatic operation of an off-line generated program, the program is loaded into the data store. This be accomplished by a reading device associated with the console unit 40, or the program may be input directly via a communication line. A workpiece is loaded on the conveyor, and the cycle is initiated in a manner similar to that earlier described. As the workpiece moves on the conveyor, a tracking function signal is recognized; and the workpiece activates the switching device 186. A start signal is generated on line 46 which is operative via the processor 26 to preset the position store 52. In contrast to the earlier embodiment wherein the preset number may be chosen arbitrarily, with an off-line generated program, the magnitude of the preset number is most important. The exact distance from the switching device to a reference point on the machine element can be precisely determined. Further, at the point where the workpiece triggers the switching device, the distance from the switching device to a reference point on the workpiece can be precisely determined. At the time the switching device is activated, the distance from the reference point on the workpiece to the reference point on the machine element represents an alignment or bias dimension which is preset in the store 52. Further, the reference points may be chosen such that the coincidence of these two points represents an alignment point for initiating the generation of the off-line program. With the exception of the difference in presetting the store 52 as described above, the operation of the tracking apparatus is exactly the same as that disclosed for an on-line generated program.

Figure 9:
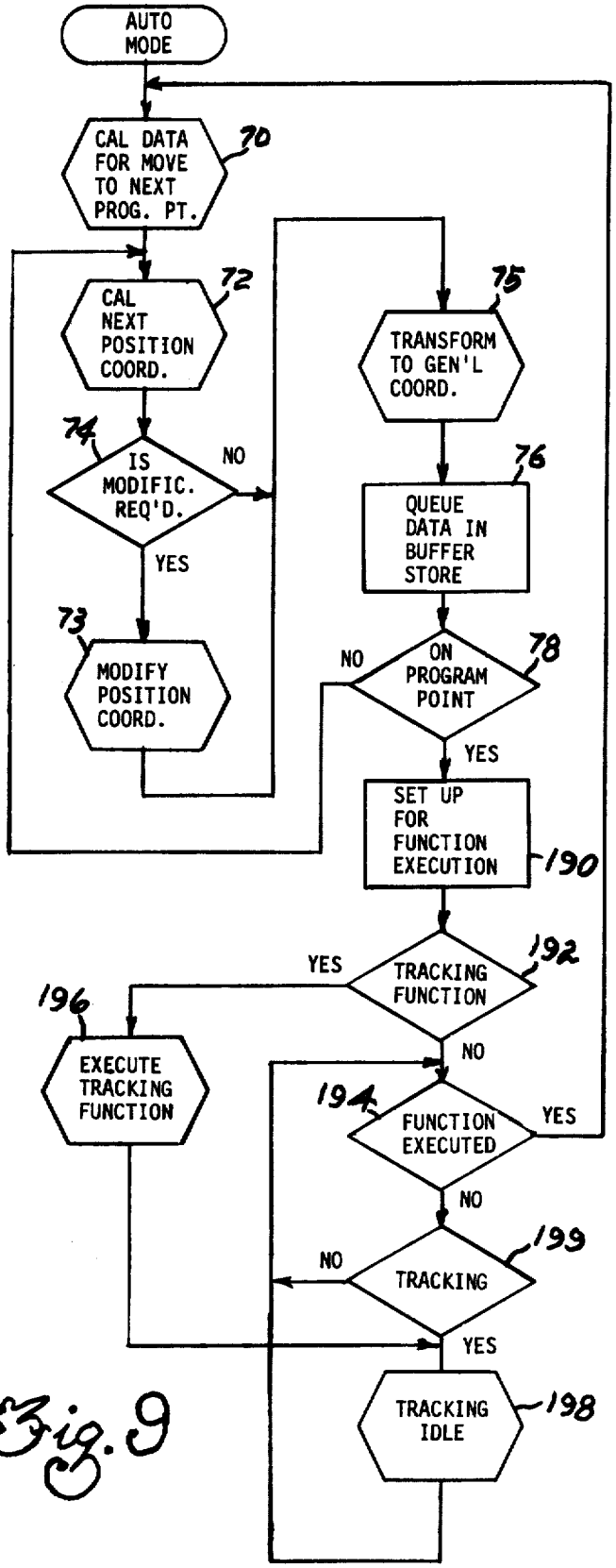
FIG. 9 is a flow chart of a routine for operating the conveyor tracking system in an automatic mode.

FIG. 9 is a flow chart of a routine illustrating a general cycle of operation for conveyor tracking in the automatic mode. It should be noted that FIG. 9 is similar to FIG. 2 with the addition of some process steps unique to tracking. The process relative to blocks 70 through 78 operates as earlier described. If the machine moves to a programmed point, the process moves to block 190 which requires that the process be set up for a function execution. Next, block 192 determines whether or not a tracking function has been programmed. If not, the process goes to block 194 to determine if the function has been executed and continues as subsequently described. If tracking is called for, the process moves to the tracking *function* subroutine called for in block 196 and shown in detail in FIG. 10.

The first step in the tracking function subroutine is described in the input-output block 200 which requires that the tracking interface be initialized or reset. This is a standart process required in any digital circuit before its operation is to commence, i.e. the digital circuit is set up to some predetermined condition. Next, in process block 202, the process waits for a start signal generated by the limit switch 186. When the motion of the workpiece 180 on the moving conveyor 182 closes the limit switch 186, the start signal produces a tracking interrupt to the input/output interface 42. The input/output process block 204 reads the status of an interface board within the input/output interface 42. The board status may be set to a number of conditions which are represented by a like number of binary codes. If the limit switch is activated, and a status code exists which represents hardware failure condition, the decision block 206 moves the process to the input/output block 208 which causes this board to be disabled. Next, a subroutine 210 is executed which causes a failure message to be displayed to an operator. Finally, the process moves to a stop routine which disables the operation of the machine.

If the limit switch 186 is activated and the board status as read by block 204 indicates that there are no hardware error conditions, the decision block 206 moves the process to block 214 which sets the start signal status. From here, the process returns to the original subroutine and moves to block 216 to set a tracking status. After this, the process continues to the tracking idle routine called for in process block 198 of FIG. 9 and shown in detail in FIG. 11.

FIG. 11 is a detailed flow chart illustrating a routine for causing the machine element to follow the conveyor motion with no successive command signals being generated by the automatic mode program. The first step of the process illustrated in block 220 is to get the next programmed input signal along the tracking axis. This coordinate is temporarily stored until it is needed later on in the program. Next, the block 222 modifies the last calculated command signal to compensate for conveyor motion. The details of this [undating] *updating* process are illustrated in FIGS. 4 through 7 and have been described earlier.

After the command signals has been modified in accordance with the conveyor motion, the process returns to FIG. 11; and the modified command signals are queued in the buffer store for a servo interrupt signal in block 224. The servo interrupt process operates in the same manner as disclosed in FIG. 3. After the modified command signals have been transferred from the buffer store to the servo drive and interrupt circuit, the process moves to the subroutine block 226 which requires that the next programmed [iput] *input* signal obtained in process block 226 be initialized. The initialization process is similar to that described in FIG. 5. The current conveyor position as represented by the absolute position signal from the position store 52 is scaled according to the mechanical drive on the conveyor transducer to produce a first signal. This first signal is added to the next programmed input signal to produce an initialized input signal. Decision block 228 examines the initialized input signal to determine whether or not the point on the workpiece associated with the initialized input signal has moved to within the physical range of operation on the machine element. If it is not, the process returns to block 222 which again modifies the most recent calculated command signal as a function of the continuous conveyor motion. The modification routine has been previously described and is shown in FIG. 4. After this program produces modified command signals, they are output from the buffer store to the servo drive and interrupt circuit. Next, in block 226, the next programmed input signal is initialized again according to the now current conveyor position; and again, block 228 determines if the point on the workpiece associated with the initialized input signal is within the physical range of motion of the machine element. If not, the process iterates through the loop defined by blocks 222 through 228 until the point on the workpiece moves within the physical tracking range of motion of the machine element. When this occurs the process returns to subroutine block 194 of the automatic mode shown in FIG. 9. If the function has been executed, the process goes to block 70.

At this point, subroutine 70 in FIG. 9 calculates the data for the motion to move the machine element to the next programmed point. Next, block 72 produces command signals representing coordinate values of the next point. Next, block 74 determines whether or not modification is required, i.e. if tracking is required, and moves up to subroutine 73 which causes the command signals to be updated in accordance with the subroutines disclosed in FIGS. 4 through 7. After updating, the modified command signals are transformed and transferred from the buffer store to the servo drive and interrupt circuit consistent with the routine shown in FIG. 3. Next, the process moves to block 78 which determines whether or not the machine element has moved to the next program point. If not, the process iterates between blocks 72 and 78 until the next program point is reached.

At this time, the execute function blocks 190, 192 and 194 will move to the tracking decision block 199 as shown in FIG. 9. If the process is still in a tracking mode, the process moves to the tracking idle routine described in FIG. 11. If the process is not in the tracking mode, the process moves back to the subroutine block 70 via block 194 and proceeds through the automatic mode in the normal manner without tracking.

Several points should be noted relative to the apparatus shown in FIGS. 9 through 11. First, the application of the disclosed tracking mode is applicable to either a linear or non-linear conveyor motion. There may be situations where the conveyor moves in an arc around the manipulator, and it is required that the manipulator move in a similar arc to follow a workpiece moving on the conveyor. Obviously, the command signals generated by the automatic mode program would be in units of rotational displacement. Further, the feedback signal would have to have similar dimensional units. However, such a situation could be readily handled by one who was skilled in the art; and the disclosed apparatus would be applicable to such a situation.

Second, the apparatus is applicable to the situation where a programmed point relative to a workpiece moves along a path defined by two or more axes of motion, and it is required that the manipulator follow the programmed point along such a path. In this situation, duplicate start signal generators, feedback transducers, measuring circuits, incremental position stores and position stores would be required. For example, as shown in FIG. 12, a point on a workpiece 176 may experience an unprogrammed change in its position relative to a machine element 166 along an axis of motion perpendicular to the axis of workpiece motion. In this case, a start signal generator 170 and feedback transducer 172 may be coupled to a spring loaded probe 168 attached to the machine element 166. Duplicate measuring circuit and position stores would be responsive to the start signal on line 46 and output signals on line 58. As discussed earlier, the start signal generator 170 and feedback transducer 172 may be replaced by a feedback transducer producing output signals representing the absolute position of the probe. In operation, the probe 168 contacts the workpiece 176 as it moves past the machine element 166. The probe will deflect in response changes in workpiece position along an axis of motion perpendicular to the workpiece motion. The probe deflection is detected by the feedback transducer 172, and the control system would operate as heretofore described to modify the appropriate command signal to compensate for the unprogrammed change in the relative position between the workpiece and machine element.

Another variation on the embodiment exists in the situation where the workpiece does not move continously on the conveyor past the machine element but merely moves some arbitrary distance past the switching device 186 and then stops. The control system would be sensitive to such a situation and maintain alignment between the manipulator element and the non-moving workpiece. Another alternative exists where the transducer instead of being mechanically connected to the conveyor is mechanically connected to a manual handwheel input, e.g. a handwheel which permits the operator to input the signals precisely aligning the program with a workpiece. This may be useful, for example, in the situation where an off-line program is used with a stationary workpiece. In order to align the program to the workpiece, the first point of the program is replayed; and then by manually moving the transducer, the machine element is moved to a location on the workpiece corresponding to the first programmed position. At this point, the transducer input is locked, and the remaining points in the program will be aligned.

While the invention has been illustrated in some detail, according to the preferred embodiment shown in the accompanying drawings, and while the preferred embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for modifying command signals representing predetermined positions of a machine element relative to a workpiece to compensate for measurable unprogrammed changes in the relative position between said machine element and workpiece, said machine element being controlled by a servomechanism circuit generating interrupt signals defining fixed time intervals and causing command signals to be transferred to the servomechanism circuit, the apparatus comprising:

a. means for producing feedback signals representing the sign and magnitude of an unprogrammed change in the relative position between the machine element and the workpiece;

b. means responsive to command signals and the feedback signals for initializing the command signal as a function of the unprogrammed change in the relative position occurring up to the time of a first interrupt signal defined by the most recent occurrence of an interrupt; and c. means responsive to the feedback signals and the interrupt signals for producing a modified command signal by modifying the initialized command signal as a function of the unprogrammed change in the relative position occurring from the time of the first interrupt signal until the occurrence of a second interrupt signal causing the modified command signal to be transferred to a servomechanism circuit.

2. An apparatus for modifying a command signal representing a predetermined position of a machine element relative to a workpiece to compensate for measurable unprogrammed changes in the relative position between said machine element and said workpiece, said machine element being controlled by a servomechanism circuit generating interrupt signals defining fixed time intervals, the apparatus comprising:

a. means responsive to a predetermined position of the machine element relative to the workpiece for generating a start signal;

b. means for producing feedback signals representing the sign and incremental magnitude of unprogrammed changes in the relative position between the machine element and the workpiece;

c. means responsive to the start signal and the feedback signals for producing a first signal representing a current change in the relative position between the machine element and the workpiece with respect to a predetermined point;

d. means responsive to an interrupt signal and the feedback signals for producing a second signal representing a change in the position of the machine element relative to the workpiece during a queuing time defined by a number of fixed time intervals; and e. means responsive to the first signal, the second signal and the command signal for producing a modified command signal, said modified command signal compensating the machine element motion for the unprogrammed changes in the relative position between the machine element and the workpiece and causing the machine element to move to the predetermined position relative to the workpiece.

3. The apparatus of claim 2, wherein the means for producing feedback signals further comprises:

a. means responsive to the unprogrammed changes in the relative position between the machine element and the workpiece for producing electrical output signals in response thereto; and b. means responsive to the start signal and the electrical output signals for producing a first feedback signal representing an incremental magnitude of the unprogrammed change in the relative position between the machine element and the workpiece and a second feedback signal representing the direction of said unprogrammed change in the relative position.

4. The apparatus of claim 3, wherein the means for producing the first signal further comprises:

a. means responsive to the feedback signals for storing the algebraic accumulation of the feedback signals to produce an absolute position signal; and b. means responsive to the storing means for scaling the absolute position signal to produce the first signal.

5. The apparatus of claim 4, wherein the means for producing the first signal further comprises means responsive to the start signal for presetting the storing means to a predetermined number whereby the absolute position signal represents the current unprogrammed change in the relative position with respect to the predetermined number.

6. The apparatus of claim 5, wherein the means for producing the second signal further includes:

a. means responsive to the feedback signals and the interrupt signals for storing an algebraic accumulation of the feedback signals during a fixed time interval to produce an incremental position signal; and b. means responsive to the incremental position signal for producing an average velocity signal representing the average velocity of the unprogrammed change in the relative position between the machine element and the workpiece during the number of fixed time intervals; and c. means for multiplying the average velocity signal by the time duration defined by the number of fixed time intervals to produce the second signal.

7. The apparatus of claim 6, wherein the means for producing the modified command signal further comprises means for algebraically summing the command signal plus the first signal plus the second signal.

8. A method for modifying command signals representing predetermined positions of a machine element relative to a workpiece to compensate for measurable unprogrammed changes in the relative position between said machine element and workpiece, said machine element being controlled by a servomechanism circuit generating interrupt signals defining fixed time intervals and causing command signals to be transferred to the servomechanism circuit, the method comprising the steps of:

a. producing feedback signals representing the direction and magnitude of an unprogrammed change in the relative position between the machine element and the workpiece;

b. initializing a command signal in response to the feedback signals as a function of the unprogrammed change in the relative position occurring up to the time of a first interrupt signal representing the most recent occurrence of an interrupt;

c. producing, in response to the initialized command signal and the feedback signals, a modified command signal by modifying the initialized command signal as a function of the unprogrammed change in relative position occurring from the time of the first interrupt signal to the time of the second interrupt signal causing the modified command signal to be transferred to the servomechanism circuit; and d. iterating steps (b) and (c) during each fixed time interval in which an unprogrammed changed in the relative position occurs between the machine element and the workpiece occurs.

9. A method for modifying command signals representing predetermined positions of a machine element relative to a workpiece to compensate for measurable unprogrammed changes in the relative position between said machine element and workpiece, said machine element being controlled by a servomechanism circuit generating interrupt signals defining fixed time intervals, the method comprising the steps of:

a. generating a start signal in response to a predetermined position of the machine element relative to the workpiece;

b. producing feedback signals representing the direction and incremental magnitude of unprogrammed changes in the relative position between the machine element and the workpiece;

c. producing, in response to the start signal and the feedback signals, a first signal representing a current change in the relative position between the machine element and the workpiece with respect to a predetermined point;

d. generating, in response to the feedback signals and an interrupt signal, a second signal representing a change in the relative position between the machine element and the workpiece during a queuing time defined by a number of fixed time intervals;

e. modifying a command signal as a function of the first signal and the second signal to produce a modified command signal, said modified command signal compensating the motion of the machine element for the unprogrammed real time changes in the relative position between the machine element and the workpiece and causing the machine element to move to the predetermined position relative to the workpiece; and f. iterating steps (b) through (e) to compensate the command signal for further unprogrammed changes in the relative position between the machine element and the workpiece.

10. The method of claim 9 wherein the step of producing feedback signals further comprises the steps of:

a. detecting the unprogrammed change in the relative position between the machine element and the workpiece;

b. producing electrical output signals as a function of the direction and magnitude of said unprogrammed change in the relative position; and c. producing in response to the start signal a first feedback signal representing an incremental magnitude of the unprogrammed change in the relative position and a second feedback signal representing the direction of the unprogrammed change in the relative position.

11. The method of claim 10, wherein the step of producing the first signal further comprises:

a. presetting a storage device in response to the start signal whereby the number in the storage device represents a displacement relative to a predetermined point; and b. storing the feedback signals in the storage device to produce an absolute position signal representing the total change in the relative position between the machine element and workpiece with respect to the predetermined point; and c. scaling the absolute position signal to produce the first signal whereby the resolution of the first signal corresponds to the resolution of the command signal.

12. The apparatus of claim 11, wherein the step of generating the second signal further comprises the steps of:

a. measuring the sign and magnitude of the unprogrammed change in the relative position between the machine element and workpiece during each fixed time interval;

b. calculating the average velocity of the unprogrammed change in the relative position during the number of fixed time intervals; and c. multiplying the average velocity of the magnitude of the queuing time to produce the second signal.

13. The method of claim 12, wherein the step of measuring the sign and magnitude of the unprogrammed change in position further comprises the steps of:

a. presetting a second storage device in response to each interrupt signal;

b. storing the feedback signals in the second storage device to produce an incremental position signals representing the total change in relative position during the fixed time intervals; and c. scaling the incremental position signal to cause the resolution of the incremental position signal to the command signal.

14. The method of claim 12, wherein the step of producing the modified command signal further comprises the step of multiplying the average velocity of the unprogrammed change in the relative position times the inverse of the magnitude of a velocity constant of the servomechanism circuit to produce a following error signal.

15. The method of claim 14, wherein the step of generating a modified command signal further comprises the step of algebraically summing the command signal plus the first signal plus the second signal plus the following error signal.

16. An apparatus for causing a machine element to track a moving conveyor containing a workpiece, said machine element operating in response to a servomechanism circuit generating interrupt signals defining fixed time intervals and causing command signals to be transferred to the servomechanism circuit, said servomechanism circuit operating in response to a control system producing command signals representing successive positions of the machine relative to the workpiece along an axis of motion approximately parallel to the motion of the conveyor, the apparatus comprising:

a. means responsive to the motion of the workpiece for generating a start signal representing the start of a tracking operation;

b. means responsive to the start signal and the conveyor motion for producing feedback signals representing the direction and magnitude of the conveyor motion;

c. means responsive to the start signal and the feedback signals for producing first signal representing the displacement of the conveyor relative to a predetermined point;

d. means responsive to the interrupt signals and the feedback signals for producing a second signal representing the displacement of the conveyor during a queuing time defined by a number of fixed time intervals;

e. means responsive to the first signal, the second signal and a command signal for generating a modified command signal representing a new position of the machine element after a subsequent queuing time; and f. means responsive to the generating means for storing the modified command signal whereby said modified command signal is transferred to the servomechanism circuit in response to an interrupt signal defining the subsequent queuing time.

17. The apparatus of claim 16, wherein the means for producing conveyor feedback signals further includes:

a. means mechanically connected to the conveyor and producing electrical output signals in response to the conveyor motion; and b. means responsive to the electrical output signals for producing a first feedback signal representing an incremental magnitude of conveyor motion and a second feedback signal representing the direction of conveyor motion.

18. The apparatus of claim 17, wherein the means for producing the first signal further comprises:

a. means responsive to the feedback signals for storing the algebraic accumulation of conveyor motions to produce an absolute position signal;

b. means responsive to the start signal for presetting the storing means to a predetermined number whereby the absolute position signal represents the algebraic accumulation of conveyor motion relative to said predetermind number; and c. means for scaling the absolute position signal to produce the first signal.

19. The apparatus of claim 18, wherein the means for producing the second signal further includes:

a. means responsive to the interrupt signals and the feedback signals for storing an incremental position signal representing the displacement of the conveyor during a fixed time interval; and b. means responsive to a number of successive incremental position signals for producing the second signal representing an average displacement of the conveyor over the number of fixed time intervals.

20. The apparatus of claim 19, wherein the means for producing the modified command signal further comprises means for algebraically summing the command signal plus the first signal plus the second signal to produce the modified command signal.

21. An apparatus for causing a machine element to track a moving conveyor containing a workpiece, said machine element operating in response to a servomechanism circuit generating interrupt signals defining fixed time intervals and causing command signals to be transferred to the servomechanism circuit, said command signals representing coordinate values of positions of the machine element relative to a predetermined point along an axis of motion approximately parallel to the motion of the moving conveyor, the apparatus comprising:

a. means responsive to the motion of the workpiece for generating a start signal representing the start of a tracking operation;

b. means responsive to the start signal and the conveyor motion for producing feedback signals representing the direction and magnitude of the conveyor motion;

c. means responsive to a command signal and the feedback signals for initializing the command signal as a function of the conveyor motion occurring from the time of occurence of the start signal to the most recent occurrence of a first interrupt signal;

d. means responsive to the feedback signals and the fixed time interval for modifying the initialized command signal to produce a modified command signal to compensate for conveyor motion from the time of the first interrupt signal until the occurrence of a second interrupt signal causing the transfer of the modified command signal to the servomechanism circuit;

e. means for storing the modified command signal during the time between said first and second interrupt signals.

22. The apparatus of claim 21, wherein said apparatus further comprises means responsive to the feedback signals for compensating the command signal for the following error of the machine element motion occuring in response to initializing and modifying the command signal.

23. The apparatus of claim 22, wherein the means for generating a start signal further comprises switching means located within the operating range of the machine element adjacent to the conveyor for generating the start signal in response to the presence of the workpiece.

24. The apparatus of claim 23, wherein the means for producing feedback signals further comprises:

a. means connected to the conveyor and producing electrical output signals in response to the conveyor motion; and b. means responsive to the electrical output signals for producing feedback signals representing the direction and magnitude of the conveyor motion.

25. The apparatus of claim 24, wherein the means for initializing the command signal further comprises:

a. storage means responsive to the feedback signals for producing an absolute position signal representing the displacement of the conveyor;

b. means responsive to the start signal for presetting the storage means with a predetermined number whereby the absolute position signal represents the cumulative displacement of the conveyor relative to the predetermined point after the occurrence of the start signal;

c. means responsive to the command signal and the absolute position signal for algebraically summing said signals to produce an initialized command signal representing a new position of the machine element as a function of the conveyor motion.

26. The apparatus of claim 25, wherein the means for modifying the initialized command signal further comprises:

a. means responsive to the feedback signals and the occurrences of a number of fixed time intervals for producing incremental position signals, each incremental position signal representing the displacement of the conveyor during a corresponding fixed time interval;

b. means responsive to the incremental position signals for producing an average velocity signal representing the average velocity of the conveyor over the number of fixed time intervals;

c. means for multiplying the average velocity signal by the length of time between said first and second interrupt signals to produce a second signal representing the change in conveyor displacement during the time between said first and second interrupt signals; and d. means for algebraically summing the initialized command signal and the second signal to produce a modified command signal.

27. The apparatus of claim 26, wherein the means for compensating the command signal further comprises means for multiplying the average velocity signal by the inverse of the velocity constant of the servomechanism.

28. A method for causing a machine element to track a moving conveyor containing a workpiece, said machine element operating in response to a servomechanism circuit generating interrupt signals defining fixed time intervals and causing the command signals representing new positions of the machine element to be transferred to the servomechanism circuit, said command signals representing new positions of the machine element along an axis of motion approximately parallel to the motion of the moving conveyor, the method comprising the steps of:

a. producing a start signal in response to the presence of the workpiece within the operating range of the machine element;

b. producing, in response to the start signal, a first signal representing the cumulative conveyor displacement relative to a predetermined point;

c. initializing, in response to the first signal, a command signal as a function of conveyor motion from the point of occurrence of the start signal;

d. modifying the initialized command signal as a function of an estimate of conveyor motion occuring over a fixed time interval to produce a modified command signal;

e. storing the modified command signal in a buffer store whereby said modified command signal is transferred to the servomechanism circuit in response to the next occurrence of an interrupt signal; and f. iterating steps (b) through (e) during each fixed time interval to cause the machine element to follow the conveyor.

29. The method of claim 28, wherein the step of producing a first signal further comprises the steps of:

a. detecting the motion of the conveyor;

b. producing electrical output signals as a function of the direction and magnitude of the conveyor motion;

c. presetting a storage device in response to the start signal whereby the number preset in the storage device represents a displacement relative to the predetermined point; and d. accumulating in the storage device, in response to the feedback signals, an absolute position signal representing the displacement of the conveyor relative to the predetermined point; and e. scaling the absolute position signal to produce the first signal, whereby the resolution of the first signal corresponds with the resolution of the command signal.

30. The method of claim 29, wherein the step of initializing a command signal further comprises the step of algebraically adding the first signal to the command signal.

31. The method of claim 30, wherein the step of modifying a command signal further comprises the steps of:

a. measuring the displacement of the conveyor during each of a number of fixed time intervals;

b. calculating the average velocity of the conveyor over the number of fixed time intervals;

c. multiplying the average velocity by the magnitude of a time interval defined by the number of fixed time intervals to produce an average position signal;

d. scaling the average position signal to produce a second signal; and e. adding the second signal to the initialized command signal to produce the modified command signal.

32. The method of claim 31, wherein the step of modifying the initialized command signal further comprises the steps of:

a. measuring the displacement of the conveyor during each of a number of fixed time intervals;

b. calculating the average velocity of the conveyor over the number of fixed time intervals;

c. multiplying the average velocity times the inverse of the magnitude of a velocity constant of the servomechanism circuit to produce a following error signal; and d. adding the following error signal to the initialized command signal.

*33. An apparatus for modifying a first command signal representing a position of an element of a machine relative to a first axis of a first coordinate system, said first com-*

*mand signal defining a predetermined position of the machine element relative to a workpiece having an axis of motion, said machine having a geometric configuration defining a generalized coordinate system different from the first coordinate system and said machine being controlled by a servomechanism circuit receiving command signals in response to control signals generated at time intervals; the apparatus comprising:*

*a. means for producing feedback signals representing an unprogrammed change in the relative position between the machine and the workpiece;*

*b. means responsive to a first control signal and the feedback signals for generating a first signal representing the unprogrammed change in the relative position between the machine and workpiece;*

*c. means responsive to the first signal and the first command signal for providing modified command signals, said modified command signals causing the machine element to move to the predetermined position relative to the workpiece independent of the unprogrammed change in the relative position between the machine and workpiece; and*

*d. means responsive to the modified command signals and connected to the servomechanism circuit for transferring the modified command signals to the servomechanism circuit in response to a subsequent control signal.*

*34. An apparatus for modifying a first command signal representing a position of an element of a machine relative to a first axis of a first coordinate system, said first command signal defining a predetermined position of the machine element relative to a workpiece having an axis of motion, said machine having a geometric configuration defining a generalized coordinate system different from the first coordinate system and said machine being controlled by a servomechanism circuit receiving command signals in response to control signals generated at time intervals, the apparatus comprising:*

*a. means for producing feedback signals representing an unprogrammed change in the relative position between the machine and the workpiece;*

*b. means responsive to a first control signal and the feedback signals for generating a first signal representing the unprogrammed change in the relative position between the machine and the workpiece occurring up to the time of the first control signal;*

*c. means responsive to the first command signal and the generating means for compensating the first command signal as a function of the unprogrammed change in the relative position between the machine and the workpiece;*

*d. means responsive to the compensating means for providing transformed command signals representing the position of the machine element relative to the generalized coordinate system;*

*e. storage means connected between the providing means and the servomechanism circuit for queuing the transformed command signals; and*

*f. means responsive to a subsequent control signal and the storage means for causing the transformed command signals to be transferred to the servomechanism circuit whereby the machine element moves to the predetermined position relative to the workpiece independent of the unprogrammed change in the relative position between the machine and the workpiece.*

*35. The apparatus of claim 34 wherein the generating means further comprises means responsive to the feedback signals and a second control signal for generating a compensation signal representing the following error of the machine element along the axis of the first coordinate system caused by the feedback signals.*

*36. The apparatus of claim 35 wherein the generating means further comprises means responsive to the feedback signals and the second control signal for generating a second signal representing an estimate of the unprogrammed change in relative position between the machine and the workpiece occurring between said first and second control signals.*

*37. A method for modifying a first command signal representing a position of an element of a machine relative to a first axis of a first coordinate system, said first command signal defining a predetermined position of the machine element relative to a workpiece having an axis of motion, said machine having a geometric configuration defining a generalized coordinate system different from the first coordinate system and said machine being controlled by a servomechanism circuit receiving command signals in response to control signals generated at time intervals, the method comprising the steps of:*

*a. producing feedback signals representing an unprogrammed change in relative position between the machine and the workpiece;*

*b. generating in response to a first control signal and the feedback signals a first signal representing the unprogrammed change in the relative position between the machine and the workpiece along the axis of motion of the workpiece;*

*c. providing modified command signals in response to the first signal and the first command signal, said modified command signals causing the machine element to move to the predetermined position relative to the workpiece independent of the unprogrammed change in the relative position between the machine and the workpiece; and*

*e. iterating steps (a) through (d) for each of the first command signals.*

*38. A method for modifying first command signals representing positions of an element of a machine relative to a first axis of a first coordinate system, said first command signals defining predetermined positions of the machine element relative to a workpiece having an axis of motion, said machine having a geometric configuration defining a generalized coordinate system different from the first coordinate system and said machine being controlled by a servomechanism circuit receiving command signals in response to control signals generated at time intervals, the method comprising the steps of:*

*a. producing feedback signals representing an unprogrammed change in the relative position between the machine and the workpiece;*

*b. generating in response to a first control signal and the feedback signals a first signal representing the unprogrammed change in relative position between the machine and the workpiece occurring up to the time of the first control signal;*

*c. compensating a first command signal as a function of the first signal to produce a compensated command signal;*

*d. transforming the compensated command signal into transformed command signals representing the position of the machine element relative to the generalized coordinate system;*

*e. queuing the transformed command signals;*

*f. transferring the transformed command signals to the servomechanism circuit in response to a subsequent control signal; and*

*g. iterating steps (a) through (f) for each of the first command signals to cause the machine element to move to the predetermined positions relative to the workpiece independent of the unprogrammed changes in the relative position between the machine and the workpiece.*

*39. The method of claim 37 wherein the step of compensating the first command signal further comprises the steps of:*

*a. measuring the unprogrammed change in the relative position between the machine and the workpiece between the occurrence of at least two control signals;*

*b. calculating the average velocity of the workpiece;*

*c. multiplying the average velocity times the inverse of the magnitude of a velocity constant of the servomechanism circuit to produce a following error signal; and*

*d. compensating the first command signal by the following error signal.*

*40. The method of claim 38 wherein the step of compensating the first command signal further comprises the steps of:*

*a. measuring the unprogrammed change in relative position between the machine and the workpiece between the occurrence of at least two control signals;*

*b. calculating the average velocity of the workpiece;*

*c. multiplying the average velocity by the magnitude of time the transformed command signal is stored to produce an average position signal; and*

*d. compensating the first command signal by the average position signal.*

*41. A method for modifying program command signals representing programmed positions of an element of a machine relative to a first axis of a first coordinate system, said program command signals defining predetermined positions of the machine element relative to a workpiece having an axis of motion, said program command signals being defined during a teaching mode of operation and used during an automatic mode of operation to generate subsequent command signals, wherein the method comprises the steps of:*

*a. generating during the teaching mode a first bias signal representing the absolute position of the workpiece relative to a predetermined point along the axis of motion of the workpiece;*

*b. producing during the teaching mode an initial command signal representing the absolute position of the machine element relative to the first axis of the first coordinate system;*

*c. combining during the teaching mode the first bias signal with the initial command signal to produce a program command signal defining a predetermined position of the machine element relative to the workpiece;*

*d. storing the program command signal for subsequent use during the automatic mode of operation;*

*e. iterating steps (a) through (d) during the teaching mode of operation for each initial command signal to be stored;*

*f. generating during the automatic mode a second bias signal representing an unprogrammed change in the position of the workpiece relative to the predetermined point along the axis of motion of the workpiece;*

*g. producing during the automatic mode and in response to the program command signals a first command signal representing the programmed position of the machine element relative to the first axis of the first coordinate system;*

*h. combining the second bias signal with the first command signal to cause the machine element to move to the predetermined position relative to the workpiece independent of the unprogrammed change in the position of the workpiece;*

*i. iterating the steps (f) through (h) during the automatic mode for each of the program command signals.*

* * * * *